(12) United States Patent
Miller

(10) Patent No.: US 10,706,247 B1
(45) Date of Patent: Jul. 7, 2020

(54) CAMERA BOX FOR READING AND DECODING TUBE RACK BAR CODE

(71) Applicant: David B. Miller, Concord, CA (US)

(72) Inventor: David B. Miller, Concord, CA (US)

( * ) Notice: Subject to any disclaimer, the term of this patent is extended or adjusted under 35 U.S.C. 154(b) by 0 days.

(21) Appl. No.: 16/350,819

(22) Filed: Jan. 17, 2019

Related U.S. Application Data

(60) Provisional application No. 62/709,459, filed on Jan. 19, 2018.

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .................. G06K 7/10722; B23Q 3/15786
USPC ..................................................... 235/462.41
See application file for complete search history.

(56) References Cited

U.S. PATENT DOCUMENTS

| 2017/0113909 | A1* | 4/2017 | Frey | B23Q 3/15786 |
| 2017/0153260 | A1* | 6/2017 | Barmettler | G01N 35/00732 |
| 2018/0056300 | A1* | 3/2018 | Sangermano | B01L 1/00 |

* cited by examiner

*Primary Examiner* — Allyson N Trail
(74) *Attorney, Agent, or Firm* — Richard Esty Peterson

(57) ABSTRACT

A camera box for capturing and processing bar code images on the bottom ends of laboratory tubes in a laboratory tube rack of standard size with laboratory tube compartments each having a bottom aperture utilizing a smart phone camera, the camera box including a housing with a top deck and sides with one side having a lower side opening, the top deck of the housing having an opening sized to view the underside of a rack when the tube rack is seated on the top deck over the opening and including a camera tray that supports a smart phone camera, wherein the side opening of the camera box housing is sized to receive the camera tray and a supported smart phone camera into the housing under the housing opening and a rack with at least one laboratory tube seated on the top deck, wherein on activation of the smart phone camera, an image of the underside of the rack and the barcode of any laboratory tube in the rack is captured and processed.

15 Claims, 3 Drawing Sheets

CAMERA BOX FOR READING AND DECODING TUBE RACK BAR CODE

CROSS-REFERENCE TO RELATED APPLICATIONS

This non-provisional utility application claims the priority date of the filed provisional application Ser. No. 62/709,459 filed Jan. 19, 2018.

FIELD OF INVENTION

This invention relates to the field of laboratory tube racks, particularly those containing laboratory tubes having a bar code on the bottom of the laboratory tubes contained in the rack that are visible from viewing the underside of the rack.

BACKGROUND OF THE INVENTION

A typical modern tube rack for laboratory tubes is designed to contain a number of laboratory tubes that have a discrete marker in the form of a bar code, usually a 2-D matrix code, on the bottom of the individual tubes. This bar code identifies the individual laboratory tube from others in the rack or in a series of racks containing marked laboratory tubes.

In addition, the rack itself will likely have a bar code visible from the underside of the rack that may be a classic linear bar code or a 2-D bar code in a matrix format. The modern tube rack is divided into compartments for vertically retaining the tubes, with an aperture at the bottom of each compartment to permit viewing of the barcode on the bottom end of the tubes. In this specification the term, "bar code," includes both linear and two-dimensional barcodes, as well as other bar-code-like markings that can be read and interpreted by electronic means. In a well-equipped laboratory the reader may comprise a sophisticated scanner or optical reader that reads the bar codes of racks placed on a glass platen or deck aperture for viewing the underside of a single rack or multiple racks. An example of such scanner means is disclosed in patents and published applications of this inventor as a joint inventor of such devices. However, in many situations in the health care and medical industries, such sophisticated scanner devices suitable for a well-equipped laboratory are too costly or too large for practical use in clinics and field operations. This is particularly true for low-volume laboratories or operations in the field where such costly equipment is not available.

In this invention the means for retrieving bar codes includes a cell phone camera to capture the bar codes and a software program or programs to interpret the captured codes. If advantageous, the software program or programs provides a human readable output returned to the user for review and inventory cataloging.

SUMMARY OF THE INVENTION

This invention comprises a system for inexpensively capturing bar code from the underside of a laboratory tube rack containing laboratory tubes having barcodes on the bottom end of the tubes using the camera of a modern smart phone. The system includes a camera box or studio box having a housing with a top deck. The top deck has an opening, preferably with a perimeter ledge upon which the bottom peripheral edge of the tube rack is supported and centered over the opening. The camera box housing has sides with one side having a lower side opening or slot for receiving a tray that supports and positions the smart phone within the housing of the camera box under the opening of the top deck. When a laboratory tube rack having one or more laboratory tubes is seated on the top deck over the positioned smart phone the smart phone photo app is remotely or automatically activated causing the smart phone to take an image of the underside of the tube containing tube rack.

Preferably, the image of the underside of the tube rack is immediately emailed to a proprietary web site or processing center for decoding the bar codes at the bottom ends of the laboratory tubes. The decoded image is processed into a text format or spread sheet and is typically returned to the user or stored for future access.

It is to be understood that the software program or programs can be stored in part or in whole in the smart phone itself. However, the system is designed to be utilized by a typical smartphone without additional capabilities other than its ability to be activated remotely while within the camera box. It is also understood that the laboratory tube rack is of the type divided into container compartments with a viewing aperture at the bottom of each compartment that exposes the bar code at the bottom end of each laboratory tube in the rack. Where the underside of the tube rack itself has markings or bar codes that identify the rack, that information is also captured by the smart phone when taking the image and can be decoded at the processing center where the information is stored and/or returned to the user at the site of the camera box.

The simplicity of the system allows the construction of the camera box to be made of inexpensive materials from wood, cardboard or plastic sheets. Preferably the material should block excess intrusion of light so the internal camera of the smart phone will capture a high-resolution image to facilitate decoding and processing of the captured image. These and other features of this inexpensive system for capturing bar codes from laboratory tubes in a tube rack are described in the Detailed Description of the Preferred Embodiments that follows a description of the drawings.

DETAILED DESCRIPTION OF THE PREFERRED EMBODIMENTS

Figure 1:
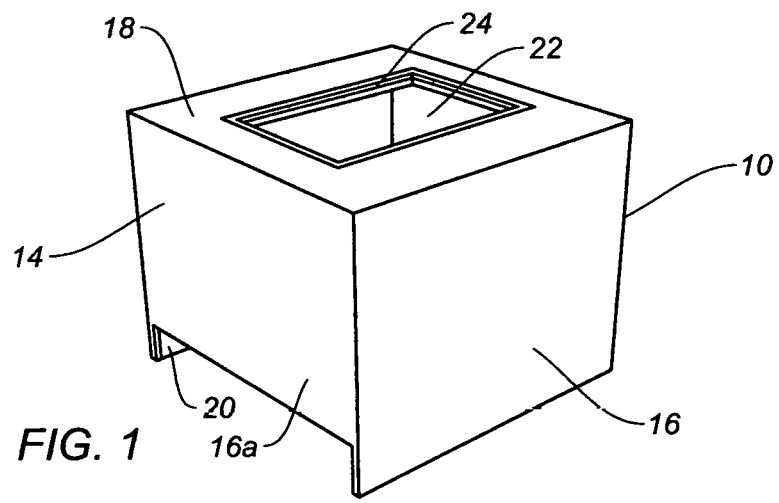
FIG. 1 is a perspective view of the housing of the camera box of the system for capturing bar codes from laboratory tubes in a tube rack.
Figure 2:
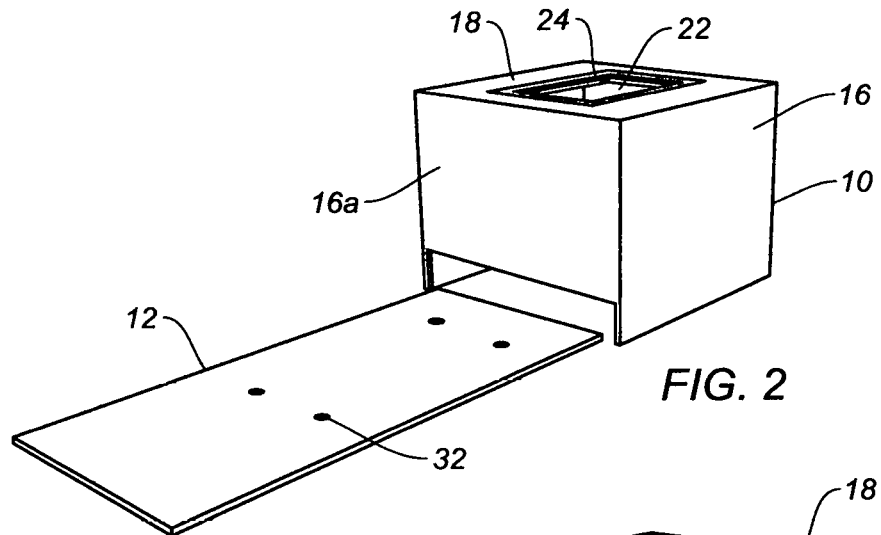
FIG. 2 is a perspective view of the camera box including the camera tray for supporting and positioning a smart phone with a camera feature in the camera box.

Referring to FIG. 1, the basic camera box 10 is shown without the component camera tray 12 depicted in FIG. 2. The camera box 10 has a housing 14 with vertical sides 16, a top deck 18 and an opening or slot 20 on one of the sides 16a for receiving the tray 12. The top deck 18 of the camera box 10 has a rectangular opening 22 that is sized to substantially conform to the bottom perimeter of a typical tube rack. The typical modern laboratory tube rack has a standard size with a matrix of tube compartments that may vary in number usually organized in an orthogonal matrix. For purposes of this invention, the compartments of the tube rack each have an aperture at the bottom of the compartment to permit viewing of a bar code at the bottom end of each laboratory tube contained in the rack while retaining the laboratory tube in the compartment. It is to be understood that this is the type of tube rack employed in this invention.

Figure 5:
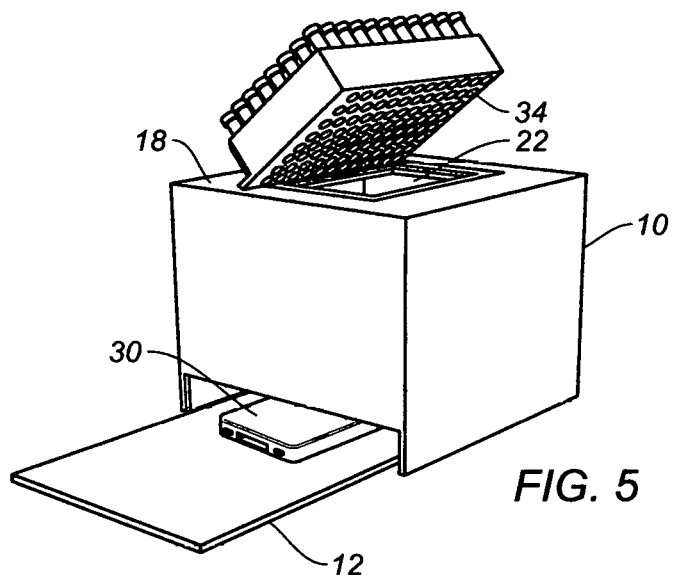
FIG. 5 is a perspective view of the combination of FIG. 4 with a tube rack containing a plurality of laboratory tubes about to be placed on the top of the housing of the camera box.
Figure 6:
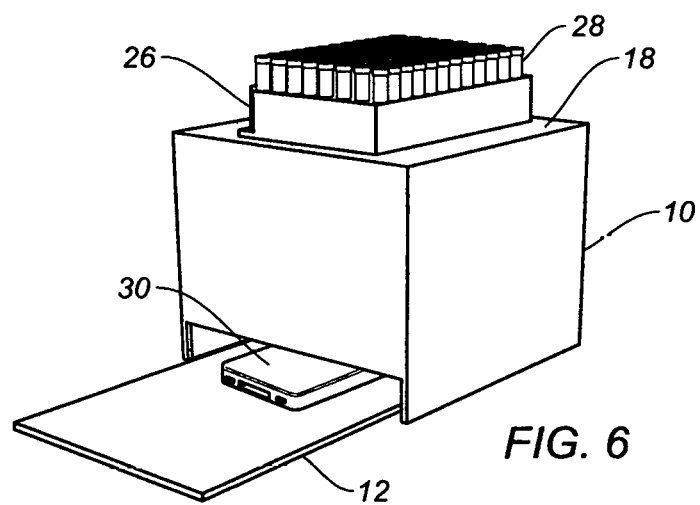
FIG. 6 is a perspective view of the camera box in combination with a smart phone and tube rack with contained laboratory tubes positioned for taking the image of the underside of the tube rack and bottom ends of the laboratory tubes.

Preferably, the opening 22 in the top deck 18 of the camera box 10 has a perimeter ledge 24 that is designed to properly seat a laboratory tube rack 26 on the top deck 18 as shown in FIGS. 5 and 6. Alternately, a perimeter line marking around the opening can be drawn to assist in centering the tube rack 26 over the opening 22.

Figure 7:
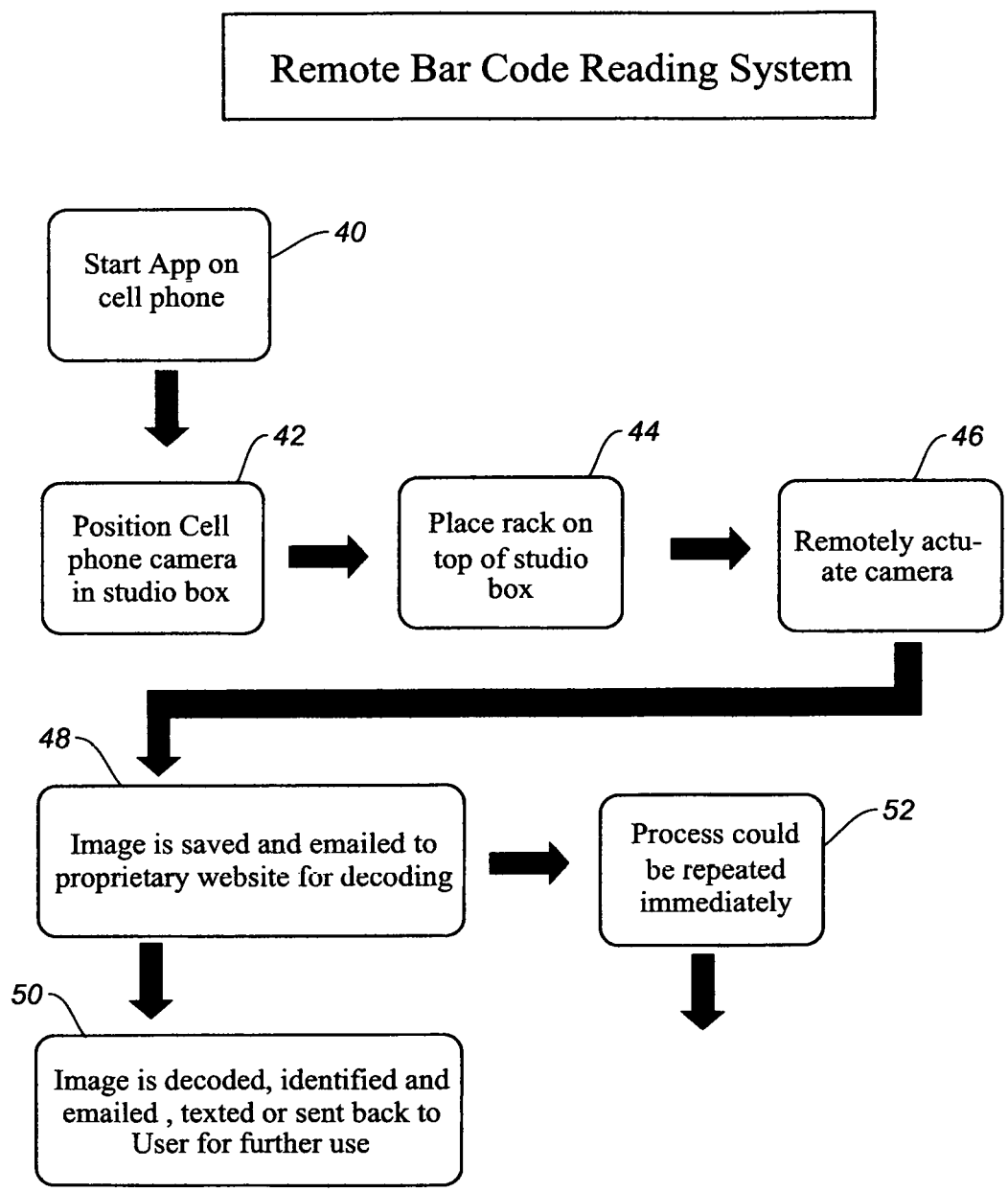
FIG. 7 is a block diagram disclosing a preferred procedure for capturing bar code from the underside of the tube rack with contained laboratory tubes and processing the captured image.

Since laboratory tubes 28 of the type adapted to the system of this invention are typically cylindrical in shape with a two-dimensional bar code centered on the bottom end of the tube, the bar codes are not likely to be aligned, with random rotational positioning of one tube from another. This is why the image capture of the multiple bar codes from the multiple tubes requires external processing as described in the procedure with reference to FIG. 7. It is to be understood, that as processing power of a smart phone improves, an applet can be contained within the smart phone used in combination with the camera box 10 of FIGS. 1 and 2 to capture and decode the bar codes of the contained laboratory tubes 28.

Figure 3:
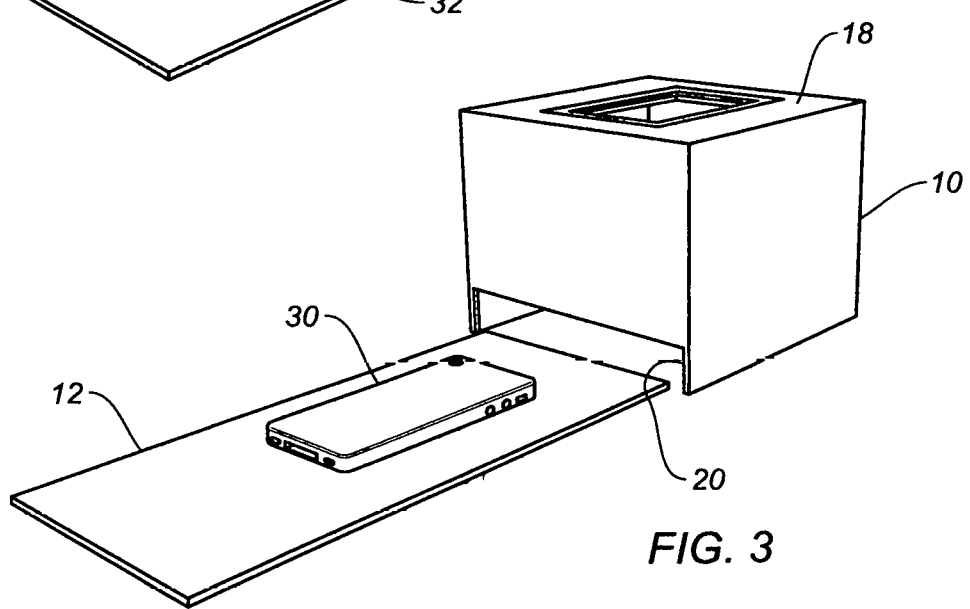
FIG. 3 is a perspective view of the camera box and camera tray in combination with a smart phone supported and positioned on the tray.

Referring to FIG. 3, the camera box 10 is operated in combination with a smart phone 30 that is supported and positioned on the camera tray 12. The camera tray 12 preferably has markers 32 to locate the smart phone 30 on the tray 12 for optimum image capture. Since different smart phones may be differently sized and may have different positions of the smart phone camera, the tray 12 may comprise a replaceable number of different templates for optimized positioning of a variety of smart phones. As the system is designed to utilize inexpensive materials from cardboard to wood or plastic sheet panels, a multiplicity of trays can be provided, each with a recess or outline of a particular smart phone. Since the back of a camera-enabled smart phone commonly has the higher resolution camera, the smart phone 30 can be placed screen face down on the tray 12 as shown in FIGS. 3 to 6 to take advantage of this better resolution.

Figure 4:
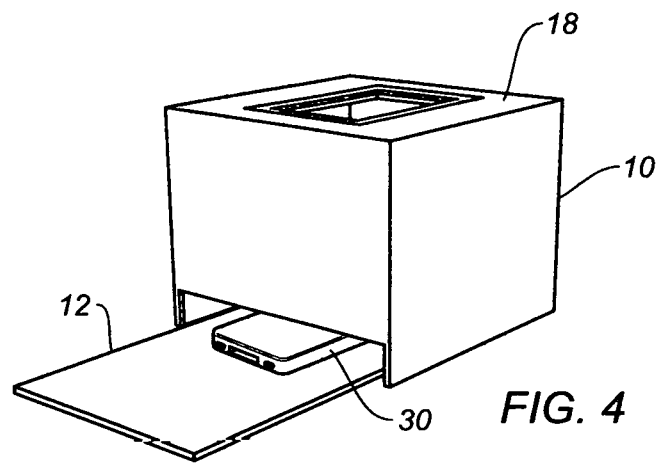
FIG. 4 is a perspective view of the combination of FIG. 3 with the camera tray displaced within the housing of the camera box.

As shown in FIG. 4, when the smart phone 30 is positioned within the camera box 10 it is prepared to take an image of the underside of the tube rack 26 already in place, or subsequently placed on the top deck 18 as shown in FIGS. 5 and 6. The ability of the modern smart phone with its integral camera to be activated remotely, or with an internal timer, permits an image capture of the underside of the tube rack 26 and its contained 2-D marked laboratory tubes 28. It is to be understood that any markings or bar code on the underside of the tube rack itself is likewise captured and can be decoded by the system described.

Although the tube rack 26 is an existing element and is in combination a part of this invention, like the smart phone, it defines the utility of the basic camera box 10. However, with regard to the camera box 10, the system cannot be defined without reference to the camera-equipped smart phone or the tube rack of the type described.

The invented system is best described with reference to a procedure for operation. It is to be understood that this is a preferred procedure at the time of this invention given the capabilities of the associated components. As suggested, in the future, the analysis of a captured image may be done locally by a programmed computer of the user and eventually by the smart phone itself, The current preferred procedure is outlined in the block diagram of FIG. 7. As noted above the sequence of steps is not critical, particularly in placing the rack and positioning the smart phone camera.

In block 40, the smart phone app for image capture is activated. This could be a timer or remote snap. With the camera locked and loaded, it is positioned within the camera box, acting as the studio box for image capture in block 42. The tube rack with marked laboratory tubes, if not earlier placed on the camera box, is positioned over the deck opening in block 44. The camera in the smart phone is activated remotely or automatically in block 46. The captured image of the underside of the tube rack including the contained tubes with exposed bottoms is saved as an ordinary image file in the smart phone and emailed to a processing center for reading and decoding the captured image in block 48. Finally, in block 50 the received image is decoded, identified and processed into a file for use. Conveniently, this may be a spreadsheet file formatted to the matrix of the tube rack with numeric identification of the tubes. The processed image capture can then be emailed back to the operator for use.

In block 52, this process can be repeated in a succession of rack placements on the camera box with image capture, email sending and decoding.

These and other features of the invention described are not intended to limit the invention to be claimed and are set forth to disclose the preferred embodiments to those skilled in the art.

The invention claimed is:

1. In a system for capturing and processing barcode images on the bottom ends of laboratory tubes in a laboratory tube rack of standard size with laboratory tube compartments each having a bottom aperture utilizing a smart phone camera,
   a camera box comprising:
   a housing with a top deck and sides with one side having a lower side opening, the top deck of the housing having an opening sized to view an underside of a tube rack when the tube rack is seated on the top deck over the opening;
   a camera tray that supports a smart phone camera, wherein the side opening of the camera box housing is sized to receive the camera tray and a supported smart phone camera into the housing under the housing opening and a tube rack with at least one laboratory tube seated on the top deck, wherein on activation of the smart phone camera, an image of the underside of the tube rack and the barcode of any laboratory tube in the tube rack is captured and processed.

2. The system of claim 1 wherein the camera box is a rectangular container with four sides and the lower side opening is in one of the four sides.

3. The system of claim 1 wherein the top deck of the housing of the camera box has a perimeter with a perimeter ledge and the laboratory tube rack has a bottom perimeter, wherein the perimeter ledge is sized to accommodate the bottom perimeter of the tube rack and seat the tube rack on the top deck of the housing.

4. The system of claim 1 wherein the camera box is fabricated from a material for field use for capturing with a smart phone camera.

5. The system of claim 4 wherein the camera box material is cardboard.

6. The system of claim 1 in combination with a processor for processing captured images by the smart phone camera.

7. The system of claim 6 wherein the processor is remotely located and processing is accomplished remotely.

8. A camera box that is fabricated from a material for field use for capturing with a smart phone camera an image of barcodes on bottom ends of laboratory tubes in a standard tube rack having compartments that hold laboratory tubes, the compartments having bottoms with apertures that permit viewing of the bottom end barcodes of the laboratory tubes carried by the tube rack, the camera box comprising:
   a housing with a top deck and sides with one side having a lower side opening, the top deck of the housing having an opening sized to view an underside of a tube rack when the tube rack is seated on the top deck over the opening;
   a camera tray that supports a smart phone camera, wherein the side opening of the camera box housing is sized to receive the camera tray and a supported smart phone camera into the housing under the housing opening and a tube rack with at least one laboratory tube seated on the top deck, wherein on activation of the smart phone camera, an image of the underside of the tube rack and the barcode of any laboratory tube in the tube rack is captured and processed.

9. The camera box of claim 8 wherein the camera tray has markers to locate the smart phone camera on the camera tray for optimum image capture.

10. The camera box of claim 8 wherein the smart phone camera is inherent in a suitable smart phone.

11. The camera box of claim 8 in combination with a tube rack having at least one contained laboratory tube with a bar code on its bottom end, and, the smart phone having a camera.

12. A process for capturing an image of bar codes on the bottom ends of laboratory tubes contained in a laboratory tube rack having compartments with aperture bottoms permitting capture of an image of an underside of the tube rack with the bar codes on the tube bottoms appearing through the compartment apertures, the process comprising the steps of:
   providing a camera box that has a housing with a top deck and sides with one side having a lower side opening, the top deck of the housing having an opening sized to view an underside of a tube rack when the tube rack is seated on the top deck over the opening, the camera box including a camera tray that supports a smart phone camera, wherein the side opening of the camera box housing is sized to receive the camera tray and a supported smart phone camera into the housing under the housing opening;
   seating the laboratory tube rack having at least one laboratory tube with a bar code on its bottom end;
   placing a smart phone camera on the camera tray positioned on the tray to capture the underside of the tube rack when the tray is received into the camera box through the side opening of the camera box;
   inserting the camera tray with the smart phone camera into the housing of the camera box;
   activating the smart phone camera to capture an image of the underside of the tube rack and any barcode on the bottom end of any laboratory tube contained in the tube rack; and,
   processing any barcode on the bottom of any laboratory tube contained in the tube rack.

13. The process of claim 12 wherein processing of the captured image is accomplished remotely.

14. The process of claim 12 wherein the smart phone camera has an internal applet for processing the captured image and decoding the barcode on the bottom of any laboratory tube contained in a tube rack from a captured image of the underside of the tube rack seated on the top deck of the camera box.

15. The process of claim 12 wherein the step of activating the smart phone camera is accomplished remotely.

\* \* \* \* \*